June 26, 1956 F. ABEL 2,752,169
BICYCLE STABILIZER
Filed April 16, 1954
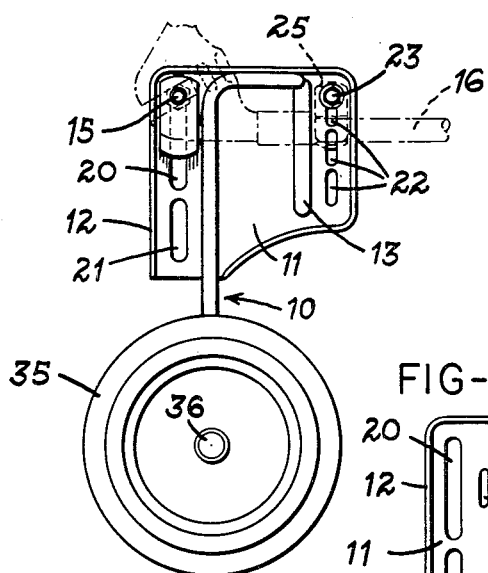
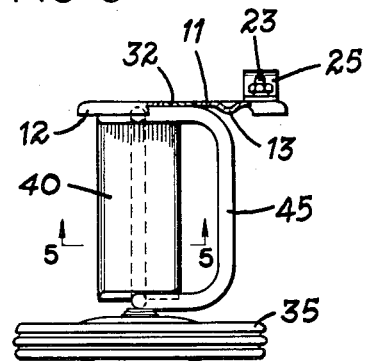
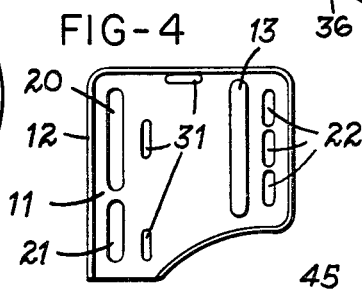
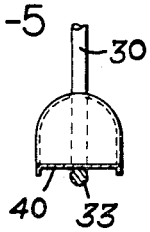
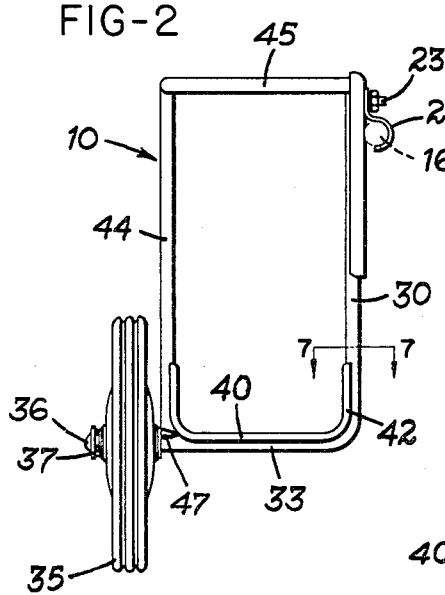
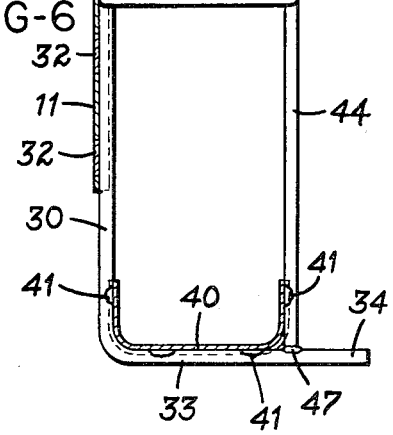
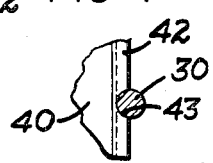
INVENTOR.
FREDERICK ABEL
BY
Marechal, Biebel, French & Bugg
ATTORNEYS

United States Patent Office 2,752,169
Patented June 26, 1956

2,752,169
BICYCLE STABILIZER

Frederick Abel, Dayton, Ohio, assignor to The Huffman Manufacturing Company, Dayton, Ohio, a corporation of Ohio Application April 16, 1954, Serial No. 423,749

2 Claims. (Cl. 280—304)

This invention relates to a stabilizer for attachment to a bicycle as an aid to a child learning to ride.

It is primarily the object of this invention to provide a stabilizer which is of simple and economical construction embodying a minimum of material and requiring a reduced amount of fabrication, which is light in weight but strong and rugged for maximum safety, which is easily adapted for attachment to bicycles of different sizes, and which is at the same time attractive in appearance.

Additional objects and advantages of the invention will be apparent from the following description, the accompanying drawing and the appended claims.

In the drawing:

Fig. 1 is a side elevational view of the right member of a pair of stabilizers constructed in accordance with the invention and with the manner of attachment to the bicycle being indicated in dotted lines;

Fig. 2 is a front elevational view of the stabilizer of Fig. 1;

Fig. 3 is a plan view of the stabilizer of Fig. 1, with part broken away in section;

Fig. 4 is a detail view of the bracket plate for the stabilizer of Fig. 1;

Fig. 5 is a fragmentary section on line 5—5 of Fig. 3;

Fig. 6 is a front view of the left stabilizer forming a pair with the right stabilizer of Fig. 2, with the wheel omitted and with parts broken away to illustrate structural details; and Fig. 7 is an enlarged fragmentary section on the line 7—7 of Fig. 2.

Referring to the drawing, which illustrates a preferred embodiment of the invention, the stabilizer comprises two main parts, namely a rod indicated generally at 10 and forming the main frame, and a bracket plate 11 which serves to mount the stabilizer frame on the bicycle. The bracket plate 11 is a single piece of sheet metal having a stiffening bead 12 around the major part of its periphery and a stiffening rib 13 formed therein.

Fig. 1 illustrates the manner of mounting the bracket plate 11 on the portion of a bicycle shown in dotted lines and including the axle 15 for the rear wheel and a horizontal portion 16 of the frame. The bracket plate 11 is provided with a pair of slots for receiving the axle 15, shown as an elongated upper slot 20 and a somewhat shorter lower slot 21. This arrangement of slots adapts the same bracket plate to mounting on bicycles of different sizes, depending upon the diameter of the rear wheel. There is a corresponding series of three slots 22 near the forward end of the bracket plate 11, and these slots are used alternatively for mounting a bolt 23 and clip 25 by which the forward end of the bracket plate is secured in fixed relation with the frame portion 16 of the bicycle.

The frame rod 10 of the stabilizer is formed as shown in Figs. 2 and 6 to define a generally rectangular configuration. The inner vertical portion 30 of the rod is welded to the bracket plate 11, and in order to provide a smooth appearance as well as a strong construction, the welding metal is applied from the back of the bracket plate through a plurality of slots 31 (Fig. 4) until the slots are substantially filled, as indicated at 32 in Fig. 6. The rod portion 30 depends from the bracket plate 11, and a lower horizontal portion 33 extends outwardly from the lower end thereof and forms a projecting stub shaft 34. A wheel 35 of suitable size is secured on this stub shaft by means of a suitable hub cap 36 and cotter pin 37.

The frame rod portion 33 forms a step for receiving the foot of a passenger, and it is provided with a step plate 40 of heavy sheet metal which is generally stirrup-shaped in form and is welded to the rod portion 33 as indicated at 41. The step plate 40 is formed with a stiffening peripheral flange 42 which is notched out at 43 to receive the inner vertical rod portion 30 and the similar outer vertical rod portion 44, and the step plate thus serves as a stiffening brace for the shaft and lower rod portions of the stabilizer.

The frame rod 10 also includes an upper horizontal portion 45 connecting the upper ends of the vertical portions 30 and 44. As shown in Fig. 3, this rod portion 45 is curved or formed in a forward loop to provide adequate space for the upper leg of a passenger standing on the step plate 40, and the sides of this rod portion 45 are substantially straight to facilitate welding of the inner such side portion to the bracket plate 11, by means of the uppermost slot 31 in Fig. 4. The lower end of the outer vertical rod portion 44 is welded at 47 to the inner end of the stub shaft 33 and thus completes a rigid brace between the upper and lower portions of the frame rod.

It will accordingly be seen that this stabilizer is of simple and light-weight construction while at the same time being easily attachable to bicycles of different sizes and being also of inconspicuously attractive appearance. Since stabilizers of this character are ordinarily used for only a relatively short time, while the child or other beginner is learning to ride the bicycle, this stabilizer is well suited for such purposes by reason of its economical initial cost. On the other hand, it is of equal importance that the stabilizer provide for maximum safety against tipping over of the bicycle during the learning period, this being especially important in the case of a child in order to prevent loss of confidence as well as possibly injury. The stabilizer of the invention satisfactorily fulfills all of these several requirements.

While the form of device herein described constitutes a preferred embodiment of the invention, it is to be understood that the invention is not limited to this precise device, and that changes may be made therein without departing from the scope of the invention which is defined in the appended claims.

What is claimed is:

1. A stabilizer of the character described for a bicycle comprising a single rod formed to define a substantially rectangular frame having upper and lower horizontal portions and inner and outer vertical portions, said outer vertical portion terminating at the lower end thereof adjacent said lower horizontal portion, said lower horizontal portion extending outwardly beyond said outer vertical portion to form a stub shaft, a wheel on said stub shaft, means securing said end of said outer vertical portion to the inner end of said stub shaft, a bracket plate of sheet metal secured to said inner vertical portion and having an aperture therethrough for receiving the rear axle of the bicycle, means on said bracket plate forwardly of said aperture for engaging a horizontal frame member of the bicycle, a step of sheet metal secured on said lower horizontal portion of said rod to receive the foot of a passenger, said step being of stirrup shape providing upwardly extending end portions thereon engaging said vertical rod portions, said step having a peripheral stiffening flange, said flange being relieved at the top of each said end portion for engagement with the adjacent said vertical rod portion to brace said step with respect to said rod, and said upper horizontal portion being formed in a forwardly extending loop with respect to said vertical portions to receive the leg of such passenger.

2. A stabilizer of the character described for a bicycle comprising a bracket plate adapted to lie in a vertical plane substantially parallel with the rear wheel of the bicycle and having a vertical elongated aperture therethrough for receiving the rear axle of the bicycle, said plate having a bead about the major portion of its periphery and adapted to extend away from the rear wheel of the bicycle, means on said bracket plate adjustable vertically of said plate for engaging the horizontal frame member of the bicycle forwardly of the rear axle thereof, a rod including an inner vertical portion secured to said plate adjacent and substantially parallel to said elongated aperture, said inner vertical portion depending from said plate and having an integral lower horizontal portion of said rod extending laterally outwardly therefrom and terminating in a stub shaft, a brace for said stub shaft including an upper horizontal portion formed in a forwardly extending loop and attached along one end thereof to said bracket immediately beneath and in abutting relation to a portion of said bead, said brace also including an outer vertical portion integral with the other end of said looped horizontal portion and having its lower end secured to said stub shaft, a step of sheet metal secured on said lower horizontal portion of said rod between said inner and outer vertical portions, said step including upwardly extending end portions engaging said inner and outer vertical portions and secured thereto to provide a step of stirrup shape, and a wheel mounted on said stub shaft outwardly of said outer vertical portion.

References Cited in the file of this patent

UNITED STATES PATENTS

| D. 169,391 | Ring | Apr. 21, 1953 |
| 2,068,125 | Kraft | Jan. 19, 1937 |
| 2,601,994 | Richman | July 1, 1952 |
| 2,682,418 | Honig | June 29, 1954 |